(12) United States Patent
Yoo (10) Patent No.: US 6,950,467 B2
(45) Date of Patent: Sep. 27, 2005

(54) METHOD AND APPARATUS FOR STREAMING VIDEO DATA

(75) Inventor: Hyuck Yoo, San Jose, CA (US)

(73) Assignee: Thin Multimedia, Inc., San Jose, CA (US)

( * ) Notice: Subject to any disclaimer, the term of this patent is extended or adjusted under 35 U.S.C. 154(b) by 598 days.

(21) Appl. No.: 09/977,272

(22) Filed: Oct. 11, 2001

(65) Prior Publication Data

US 2002/0080873 A1 Jun. 27, 2002

Related U.S. Application Data

(60) Provisional application No. 60/240,228, filed on Oct. 13, 2000.

(51) Int. Cl.⁷ .................................................. H04N 7/12
(52) U.S. Cl. .................................................. 375/240.12
(58) Field of Search ....................... 375/240.12, 240.13, 375/240.15, 240.16, 240.18, 240.19, 240.2, 240.23; 348/14.12–14.13, 14.15, 400.1, 409.1; 382/236, 238, 245–246, 248; 709/231, 247; 725/86–87

(56) References Cited

U.S. PATENT DOCUMENTS

| | | | |
|---|---|---|---|
| 5,822,541 A | 10/1998 | Nonomura et al. | |
| 5,864,682 A | 1/1999 | Porter et al. | |
| 6,057,832 A | * 5/2000 | Lev et al. | 345/720 |
| 6,154,771 A | 11/2000 | Rangan et al. | |
| 6,272,180 B1 | 8/2001 | Lei | |
| 6,339,619 B1 | * 1/2002 | Sugiyama | 375/240.26 |
| 6,499,060 B1 | * 12/2002 | Wang et al. | 709/231 |
| 6,779,041 B1 | * 8/2004 | Yoo et al. | 709/247 |

* cited by examiner

*Primary Examiner*—Vu Le
(74) *Attorney, Agent, or Firm*—Townsend and Townsnd and Crew LLP (57) ABSTRACT

A method of streaming video data includes providing a plurality of frames to be transmitted from a video transmitter system to a video receiver system. The plurality of frames are categorized into a reference frame and a prediction frame. The reference frame is encoded for transmission to the video receiver system using a zero run coding method. The encoded reference frame is transmitted to the video receiver system. The prediction frame is divided into a plurality of blocks. The plurality of blocks are examined to determine whether any of them needed to be transmitted to reproduce the prediction frame of acceptable quality at the video receiver system. Only the blocks that have been determined necessary to reproduce the prediction frame of acceptable quality at the video receiver system are transmitted to the video receiver system.

20 Claims, 9 Drawing Sheets

METHOD AND APPARATUS FOR STREAMING VIDEO DATA

CROSS-REFERNCES TO RELATED APPLICATIONS

This application claims priority to U.S. Provisional Patent Application No. 60/240,228, filed on Oct. 13, 2000, which is incorporated by reference herein for all purposes.

BACKGROUND OF THE INVENTION

The present invention relates to streaming of video data through a network.

Recent advances in computing and networking technology have popularized delivery of video data over the Internet. The Internet is a global internetwork of networks. The Internet uses the Transport Control Protocol/Internet Protocol (TCP/IP) for reliably passing data packets from a source node to a destination node.

Streaming video can be used for live or recorded events. If a live event is streamed, it is referred to as a real-time video streaming. On the other hand, if a recorded event is streamed, it is referred to as a non-real-time video streaming. The real-time video streaming technique could be used to broadcast (or multicast or unicast) lectures, sports or entertainment events, and academic or other ceremonies. The non-real-time video streaming technique could be used to broadcast (or multicast or unicast) TV reruns, movies in the form of video on demand, or other previously downloaded or saved video files.

Specific issues need to be addressed to stream video over the Internet since it was not originally designed for video streaming technologies. For example, the Internet is a shared medium and uses a best effort delivery mechanism, Internet Protocol (IP), to deliver content. There is no dedicated path between the source node and the destination node. The IP divides content into a plurality of self contained packets, which are routed independently to the destination node. Limited bandwidth, latency, noise, packet loss, retransmission and out of order packet delivery are all problems that can affect video streaming over the Internet.

In particular, the limited bandwidth of the Internet connection has been one of the main bottle neck in bringing the video streaming technology to the masses. Although computers are increasingly provided with high speed Internet connection exceeding 1 mega bits per second (Mbps), most computers still rely on the dial up connection and have no more than 56 kilobit per second (kbps) connection. Some wireless Internet devices, e.g., cell phones, have significantly less connection speed than 56 kbps. Accordingly, much effort has been invested in inventing improved methods of compressing and streaming video data.

There are a variety of compression systems used today. The Motion Picture Experts Group (MPEG) has at least three open standards that can be used for streaming. The MPEG is a joint committee of the International Organization for Standardization (ISO) and the International Electrotechnical Commission (IEG). The MPEG-1 standard, originally developed for VHS quality video on CD-ROM in 1988, has its optimal bit rate at about 1.5 Mbps for quarter screen TV (352×240) at 30 frames/sec. MPEG-1 is mainly considered as a storage format; however, it does offer excellent streaming quality for the bit-rate it supports. The MPEG-2 standard, ratified in 1996, was designed for use in digital TV broadcasting and is best known for DVD encoding. Its target bit-rate is between 4 to 9 Mbps, but it can be used in HDTV for resolutions up to 1920×1080 pixels at 30 frames per second. The MPEG-4 standard, ratified in 1999, is a new standard specifically developed to address Web and mobile delivery. Its optimal bit rate is between 385 to 768 Kbps according to specific implementations. MPEG-4 is directed to new video streaming applications based on very low bit rate coding, such as video-phone, mobile multimedia and audio-visual communications, multimedia e-mail, remote sensing, interactive games, and the like. MPEG-4's lower requisite bit rate makes it more suitable for usage in the Internet environment than prior versions of MPEG.

Like most video compression schemes, MPEG uses both interframe and intraframe compression to achieve its target data rate. Interframe compression is compression achieved between frames by eliminating redundant interframe information. The classic case is the "talking head" shot, such as with a news anchor, where the background remains stable and movement primarily relates to minor face and shoulder movements. Interframe compression techniques store the background information once, and then retain only the data required to describe the minor changes, e.g., facial movements, occurring between the frames.

Intraframe compression is compression achieved by eliminating redundant information from within a frame, without reference to other video frames. MPEG uses the Discrete Cosign Transform algorithm, or DCT, as its intraframe compression engine. By and large, however, most of MPEG's power come from interframe, rather than intraframe compression.

SUMMARY OF THE INVENTION

Accordingly, the present invention is directed to an apparatus and method for streaming video. In one embodiment, a method of streaming video data includes providing a plurality of frames to be transmitted from a video transmitter system to a video receiver system. The plurality of frames are categorized into a reference frame and a prediction frame. The reference frame is encoded for transmission to the video receiver system using a zero run coding method. The encoded reference frame is transmitted to the video receiver system. The prediction frame is divided into a plurality of blocks. The plurality of blocks are examined to determine whether any of them needed to be transmitted to reproduce the prediction frame of acceptable quality at the video receiver system. Only the blocks that have been determined necessary to reproduce the prediction frame of acceptable quality at the video receiver system are transmitted to the video receiver system.

In another embodiment, a method of streaming video data includes providing a plurality of frames to be transmitted from a video transmitter system to a video receiver system. The plurality of frames are categorized into a plurality of reference frames and a plurality of prediction frames. The plurality of the reference frames are encoded using a first encoding method. The plurality of the prediction frames are encoded using a second encoding method that is different from the first encoding method. The second encoding method includes dividing a first prediction frame into a plurality of blocks. The plurality of blocks of the first prediction frame are examined to determine, using a diff function method, whether any of them needs to be transmitted to reproduce the first prediction frame of acceptable quality at the video receiver system. Only the blocks of the first prediction frame that have been determined necessary to reproduce the first prediction frame of acceptable quality at the video receiver system are transmitted to the video receiver system.

DESCRIPTION OF THE SPECIFIC EMBODIMENTS

Figure 1:
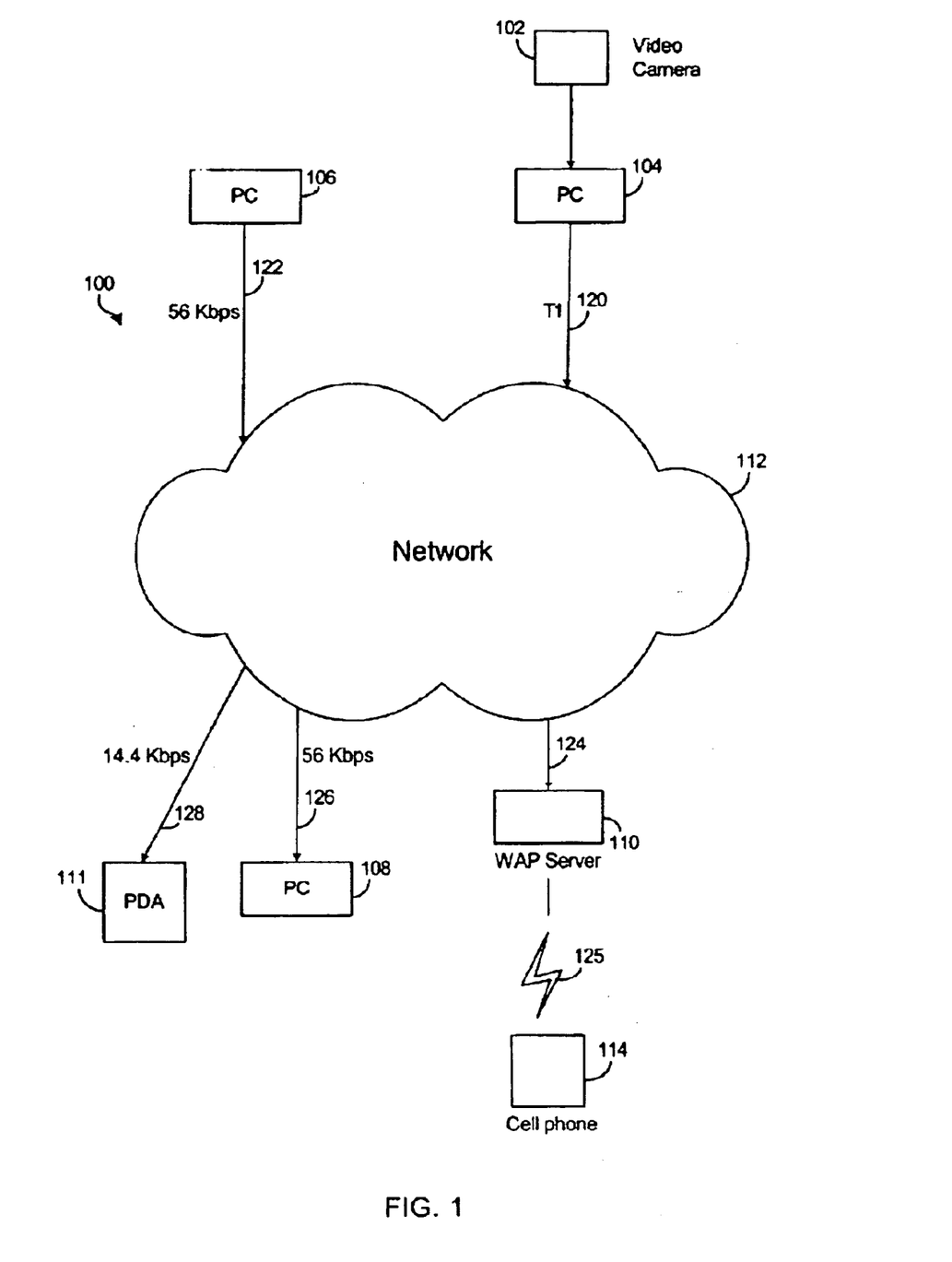
FIG. 1 illustrates a network system suitable for streaming video from a video source node to a video destination node according to one embodiment of the present invention.

FIG. 1 illustrates a network system 100 suitable for streaming video data according to one embodiment of the present invention. Network system 100 includes a video source 102 (e.g., video camera) to input video data, a plurality of computer systems 104–111 coupled to each other via a communication network 112, and a network appliance 114 coupled to computer system 110 via a wireless network connection 125. In one embodiment, the network appliance is a cell phone. Computer systems 104–111 are coupled to communication network 112 via network connections 120–128.

In the present embodiment, network 112 is the Internet. In alternative embodiments, network 112 may be any communication network, such as an intranet, a computer network, a local area network, an internet, and the like. Network 112 provides data communication among the computer systems. Data communication may include transfer of HTML based data, textual data, form submissions, plug-in programs or viewers, applets, audio data, video data, and the like. Although network 112 is illustrated as a single entity, it may be a network of individual computers and servers, as is the case with the Internet.

In the present embodiment, network connections 120–128 may have different connection speeds. For example, network connection 120 is a T1 connection having a 1.5 Mbps connection speed, as is common with businesses; network connections 122 and 126 are dial up connections having a 56 kbps connection speed, as is common with home computers, set top boxes, and the like; network connection 128 is shown as having a 14.4 kbps connection to personal digital assistants (PDAs), such as PalmOS devices, WindowsCE devices, and the like. Wireless network connection 125 is shown as a 10 kbps connection as is currently planned for typical network appliances. The connection rate may vary in alternative embodiments of the present invention. For example, alternative embodiments of network appliances may include wireless modems that may range in speeds of up to 128 kbps.

Computer systems 104–108 are embodied as typical personal computers such as those available from companies such as HP, Compaq, IBM, and the like. Such personal computers are typically powered by microprocessors such as the Athlon processor available from AMD and include operating systems such as Windows 98 from Microsoft. In alternative embodiments, other personal computers such as those available from Apple or Dell, may also be used. The computer systems may be desktop computers, laptop computers, television set top boxes, game consoles such as the Dreamcast, network computers, or other types of units incorporating processors, microcontrollers, ASICs, and the like.

Computer systems 104–111 are typically connected to network 112 via local area networks, via dial-up modems, ISDN, DSL, cable modems, satellite modems, or the like. Computer system 111 typically includes PDAs or other portable computing platforms. Such PDAs may operate on a variety of operating system platforms including PalmOS, WindowsCE, or the like. Further, such PDAs operate on a variety of processors. Such devices are typically coupled to network 112 via telephone lines, or other wire-based network connections.

Network appliance 114 may include wireless telephones utilizing cellular technology, CDMA, TDMA, or other technologies. In other examples, the network appliance may be kiosks, wrist watches, pocket or portable displays or terminals, wearable computers, retinal implants, surveillance equipment, kitchen appliances, or the like. These devices are typically coupled to network 112 via computer system 110 and wireless network 125. In one embodiment of the present invention, computer system 110 is a wireless application protocol server (WAP) that provides data to and from network appliance 114 in the WAP format. In alternative embodiments, other standard and/or proprietary formats may also be used. As used herein, the term "network appliance" refers to a device that may be wirelessly connected to a network, e.g., network 112, directly or indirectly.

Computer systems 104–111 and network appliance 114 include application software that communicates using the HTTP, TCP/IP, and/or RTP/RTSP protocols. These communication protocols are well known, thus no description is given herein. The application software is typically embodied as a web browser (client), in one embodiment. Further, the software is typically able to display *.gif, and/or *.jpg format images. The web browser software may be embodied as Netscape Navigator 4.x, Microsoft's Internet Explorer 5.x, or the like. In one embodiment, other transfer and communication protocols may also be used, for example, IPX, or the like.

In the present embodiment, it is envisioned that video data will be transferred from computer system 104 or 106 to computer systems 108, 110, and 111, as well as onto network appliance 114. In one example, video data is stored on computer systems 104 and 106 in a variety of formats including MPEG-1, MPEG-2, and MPEG-4, as are well known in the art. In alternative embodiments other video formats are envisioned and may include the Windows *.avi format, the Quicktime *.mov format, or the like. In other embodiments, streaming video formats may be used to provide video data, for example formats from RealNetworks, Microsoft, Apple, or the like. In the present embodiment, the streaming video may be from a stored video archive, or from a live video camera 102, or the like. Whether archived or live, the video is typically output by computer systems 104 and 106 onto network 112.

As explained previously, computing systems 104–111 and network appliance 114 are all coupled to network 112 with different bandwidth limited connections. In addition, the computer systems and network appliance typically have different processing power, display capabilities, memory, operating systems, and the like. As a result of these differences, each system have different abilities to receive, process, and display video data.

Figure 2:
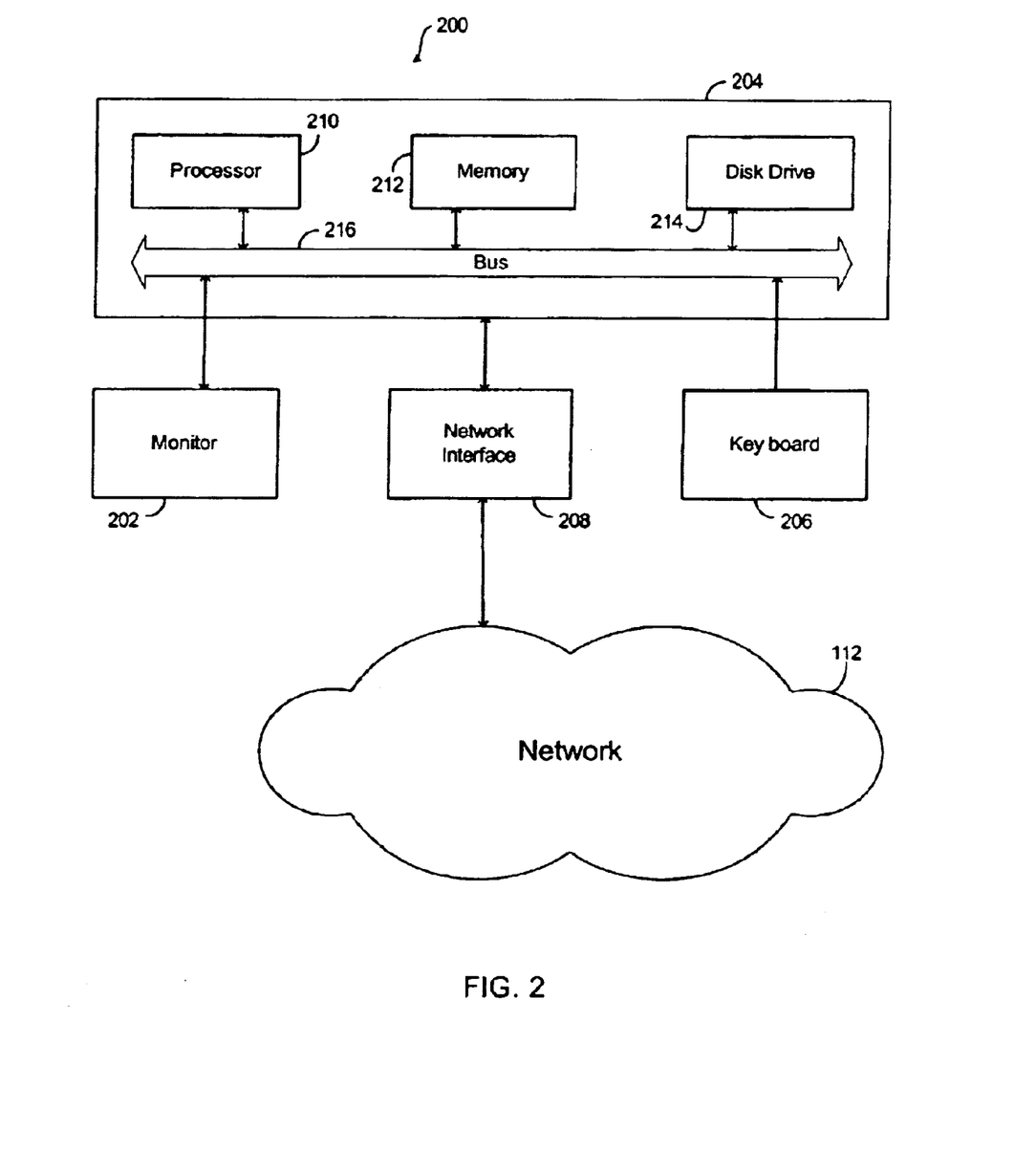
FIG. 2 illustrates an exemplary computer system that may be used for streaming video data according to one embodiment of the present invention.

FIG. 2 is a block diagram of an exemplary computer system 200 suitable for one embodiment of the present invention. Computer system 200 typically includes a monitor 202, a computer 204, a keyboard 206, and a network interface 208. The network interface is coupled to network 112. Network interface 208 may be an Ethernet card, a modem (telephone, satellite, cable, ISDN), (asynchronous) digital subscriber line (DSL) units, or the like.

Computer 204 includes familiar computer components such as a processor 210, and a memory storage device 212, a disk drive 214, and a system bus 216 interconnecting the above components. The memory storage device is generally a dynamic random access memory device. In one embodiment, the computer is a PC compatible computer having an x86 based microprocessor, such as an Athlon microprocessor from Advanced Micro Devices, Inc., and typically includes a WindowsNT operating system from Microsoft Corporation.

Memory 212 and disk drive 214 are examples of tangible media for storage of data, audio message files, computer programs, browser software, embodiments of the herein described invention, applet interpreters or compilers, virtual machines, or the like. Other types of tangible media include floppy disks, removable hard disks, optical storage media such as CD-ROMs and bar codes, semiconductor memories such as flash memories, read-only-memories (ROM), and battery-backed volatile memories, and the like. In other embodiments, the computer does not include disk drive 214.

FIG. 2 is representative of but one type of system for embodying the present invention. It will be readily apparent to one of ordinary skill in the art that many other hardware and software configurations are suitable for use with the present invention. For example, other types of processors are contemplated, such as the Pentium-class or a Celeron-class microprocessor from Intel Corporation, K6-x -class microprocessors from Advanced Micro Devices, PowerPC G3, G4 microprocessors from Motorola, Inc., and the like. Further, other types of operating systems are contemplated, such as Solaris, LINUx, UNIX, MAC OS 9 from Apple Computer Corporation, BeOS, and the like.

Figure 3:
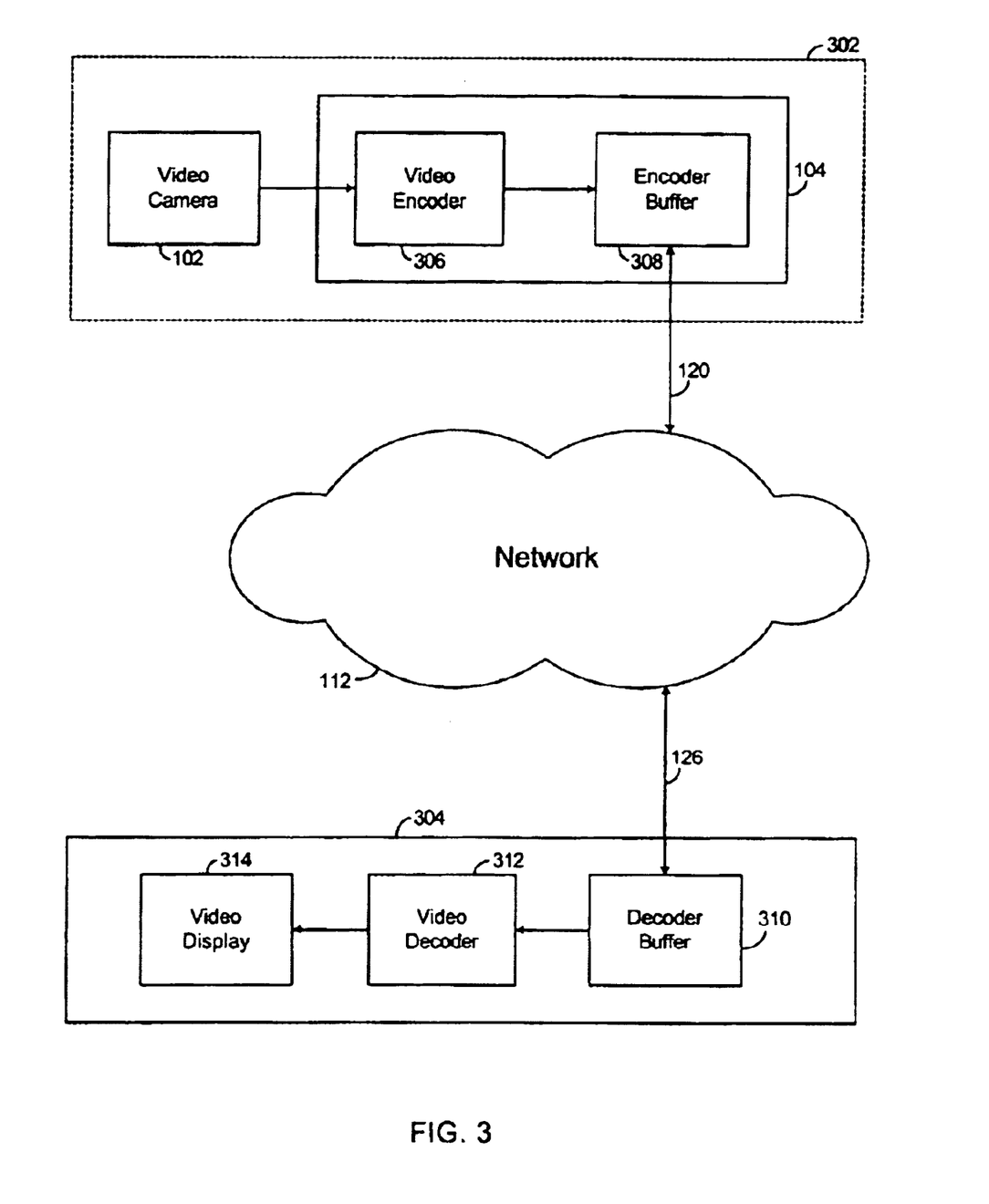
FIG. 3 illustrates a video transmitter system and a video receiver system that may be used for streaming video data according to one embodiment of the present invention.

FIG. 3 illustrates an end-to-end transmission of streaming video from a video transmitter system 302 to a video receiver system 304 via network 112 according to one embodiment of the present invention. For real-time video streaming, the video transmitter system includes video camera 102 and computer system 104 that has a video encoder 306 and an encoder buffer 308. Alternatively, for non-real-time video streaming, the video transmitter system may not include the video camera since the video data are retrieved from a previously stored location, e.g., disk drive 214, in a computer system. The video receiver system includes a decoder buffer 310, a video decoder 312, and a video display 314. The video receiver system may be computer system 108, PDA 111, cell phone 114, or other suitable device.

In the present embodiment, streaming video process begins with generating uncompressed video data or frames using video camera 102. Video encoder 306 receives the uncompressed video data at a given frame rate (or streaming rate) and compresses or encodes the data using a compression algorithm described below in connection with FIGS. 4–7. Video encoder 114 then transmits the compressed video data to encoder buffer 308 for buffering in preparation for transmission across network 112.

Video receiver system 304 receives the compressed video data via network 112 at decoder buffer 310. Decoder buffer 310 stores the compressed video data and then transmits them to video decoder 312. Video decoder 312 decompresses the video data and sends them to video display 314 for play-back.

Figure 4:
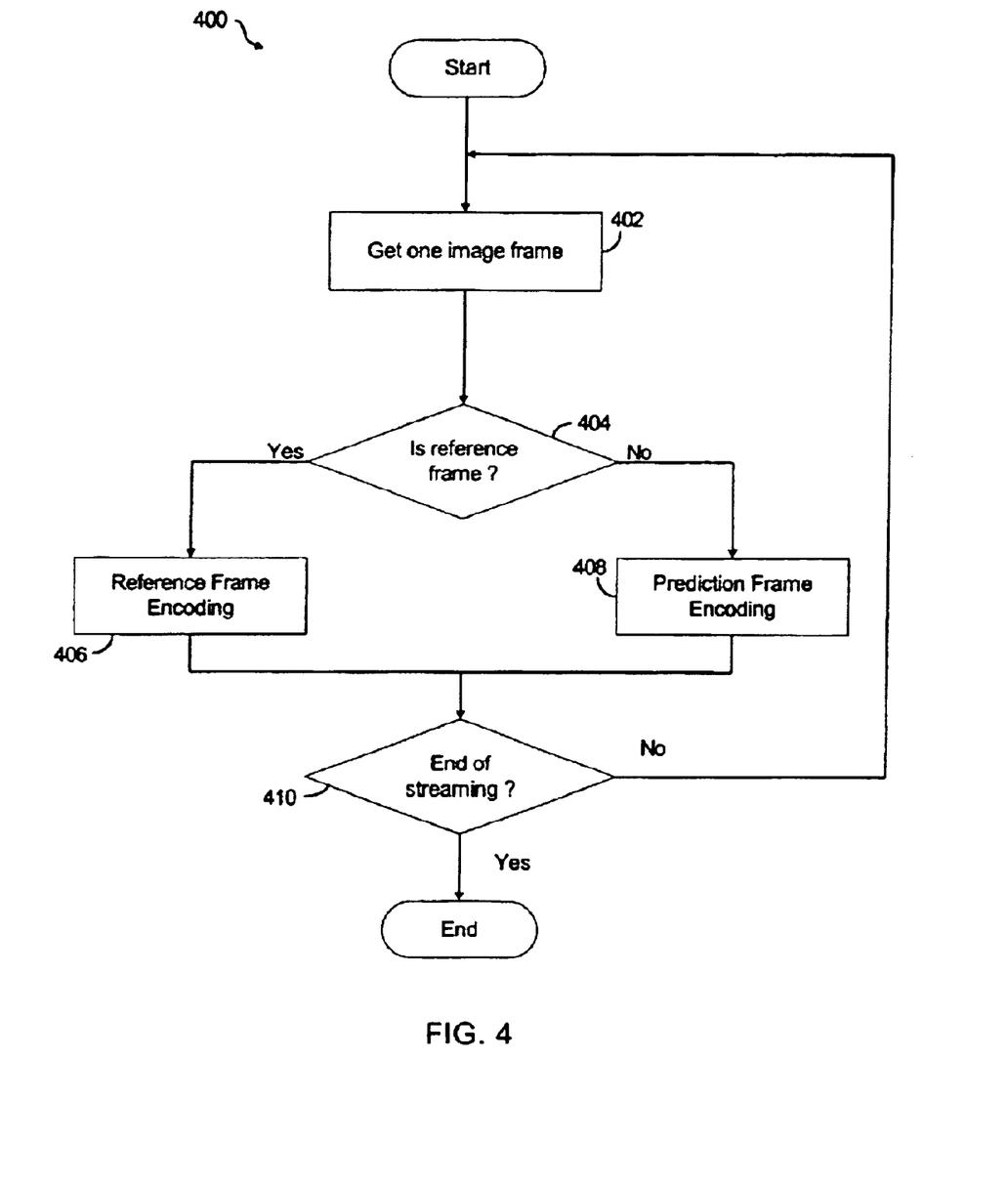
FIG. 4 illustrates a flow chart on a method of streaming video data according to one embodiment of the present invention.

FIG. 4 illustrates a process 400 that discloses a method of video streaming according to one embodiment of the present invention. A first image frame is retrieved from a video source, e.g., video camera 102 or a storage space in computer system 104 or 106, to commence streaming of the video data (step 402). The frame or information related thereto is examined to determine whether the frame is a reference frame or a prediction frame (step 404). In one embodiment, the reference frame is a frame that is encoded without reference to another frame or is used to encode another frame. The prediction frame is a frame that is encoded using another frame as a reference.

In the present embodiment, the frames are categorized as either reference frames or prediction frames according to their order of transmission. For example, the first and every Nth frames (e.g., 1st, 8th, 16th, 24th, etc.) are designated as reference frames. The remaining frames, i.e., those frames falling between two reference frames, are designated as prediction frames.

If the frame is determined to be a reference frame, the frame is encoded using a reference frame encoding step (step 406), as explained in more details below. On the other hand, if the frame is determined to be a prediction frame, the frame is encoded using a prediction frame encoding step (step 408), as explained in more details below. In one embodiment, the encoding is performed by a software residing in a video encoder in computer system 104 or 106. After the frame has been encoded, the process determines whether all the frames have been transmitted (step 410). If so, the process terminates. If not, the process returns to step 402 and retrieves the next frame to be transmitted. These steps are repeated until all the frames have been transmitted.

Figure 5:
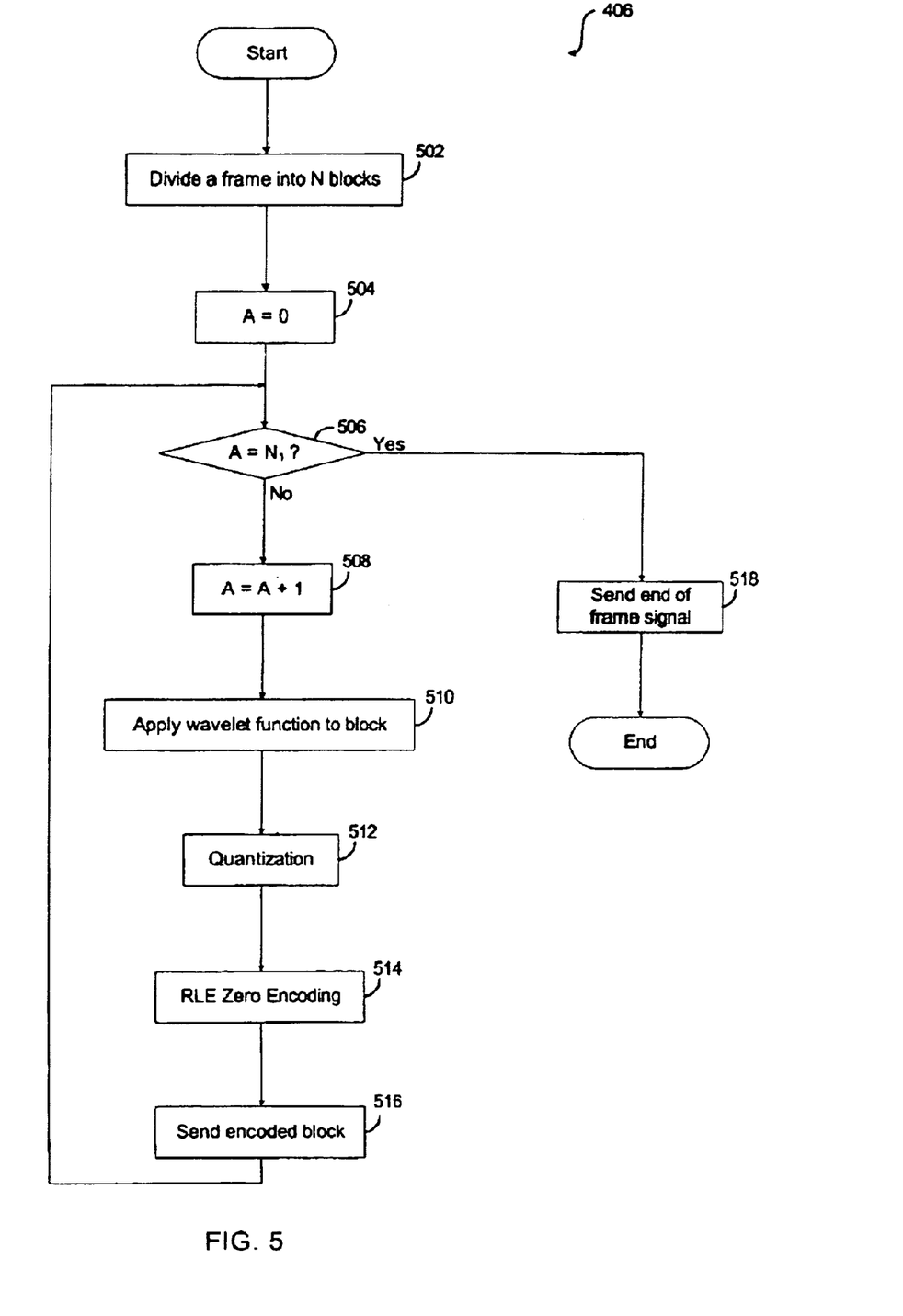
FIG. 5 illustrates a flow chart on a method of encoding reference frames according to one embodiment of the present invention.

FIG. 5 shows the step or sub-process 406 for encoding the reference frames according to one embodiment of the present invention. The reference frame is divided into $N_1$ number of blocks (step 502). In one embodiment, a frame has dimensions of 152 pixels by 128 pixels and divided into 304 blocks, each block having dimensions of 8 pixels by 8 pixels (see FIG. 9).

After dividing the frame into $N_1$ blocks, a counter A is set to zero (step 504). The counter is examined to determine whether the value stored therein is equal to $N_1$ (step 506). If so, the end of frame signal is sent and the sub-process is terminated. However, if the counter's value is not equal to $N_1$, it is increased by one (step 508), and one of the blocks is retrieved for encoding. A wavelet function or transform is applied to the block to transform its pixels values to have more zeros (step 510). The wavelet transform is more suitable for describing abrupt changes, discontinuities, and thus, edge features of images than Fourier or other periodic based transforms. In one embodiment, the wavelet transform used is 2-D Haar transform.

A stepwise quantization method is used to convert the data obtained from the wavelet transform to more a manageable form (step 512), where the resulting data contains many values of zero. Quantization is the procedure of mapping a set of X possible values to a set of Y possible data values, where X<Y.

A run length encoding (RLE) is used to compress the quantized data (step 514). In one embodiment, RLE zero encoding or zero run coding is used to compress the data. The RLE zero encoding method refers a technique used to encode a data set having a large number of consecutive or "runs" of zero values. In one embodiment, the RLE zero encoding involves encoding the values different from zero using different encoding techniques for non-zero values and zero values. Generally, the values of zero are encoded by indicating their run length.

After the RLE zero encoding step has been performed, the encoded block is transmitted to encoder buffer 308 and then sent to video receiver system 304 (step 516). The process returns to the step 506, thereby repeating the steps described above until all the blocks in the frame have been transmitted.

Figure 6:
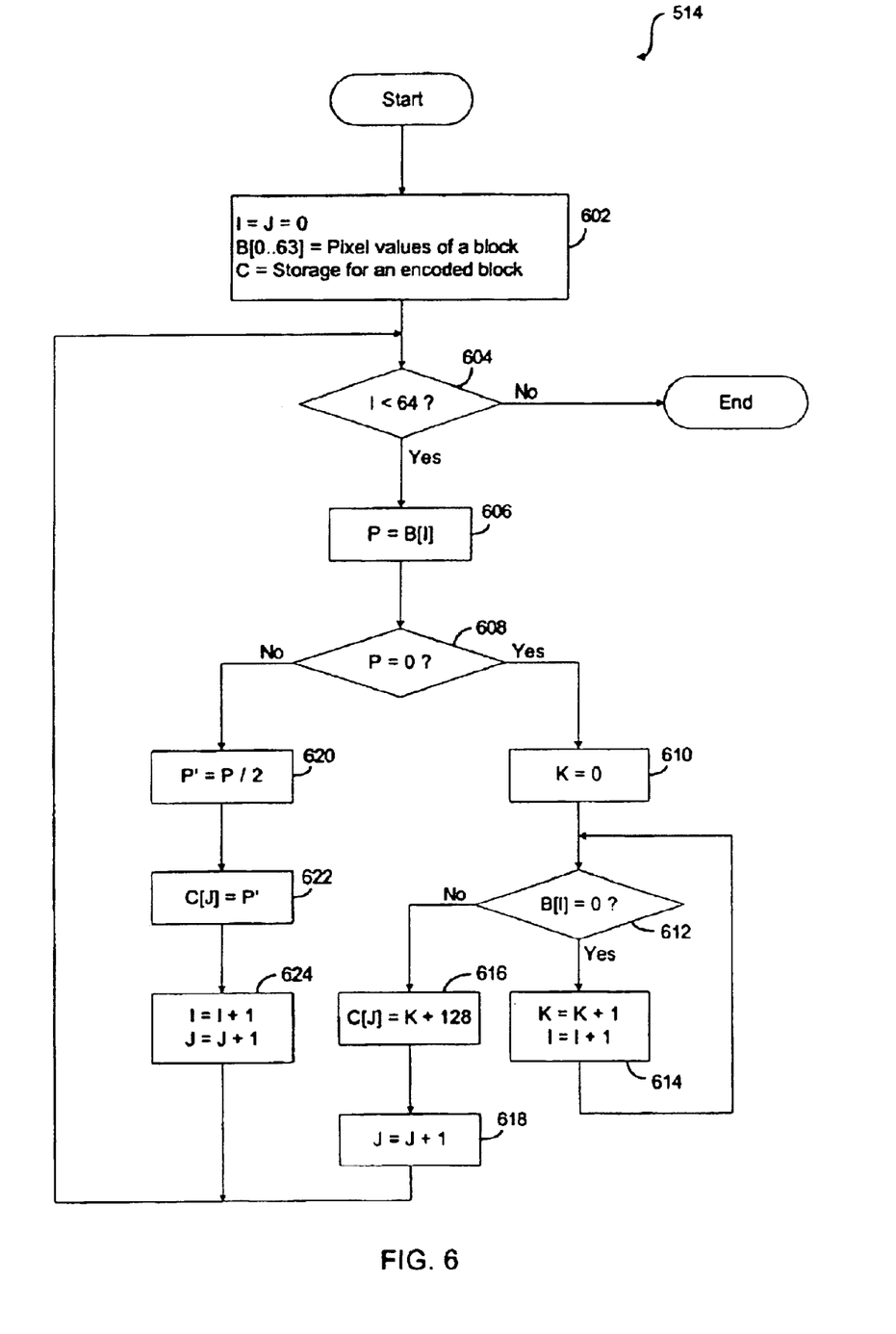
FIG. 6 illustrates a flow chart on a method of performing a RLE zero encoding step according to one embodiment of the present invention.

FIG. 6 shows the step or sub-process 514 for performing the RLE zero encoding method according to one embodiment of the present invention. The encoding is performed using data units of $N_2$ bits, e.g., 8 bits. The most significant bit (MSB) of the data unit is used to denote whether or not the RLE zero encoding has been performed. In one embodiment, one at the MSB position indicates that the RLE zero encoding has been performed, whereas zero at the MSB position indicates otherwise. The encoding process is described in greater detail below.

The sub-process commences by setting counters I and J to zero (step 602). The counter I is checked to determine whether all of the pixels within a block has been processed (step 604). In this exemplary embodiment, there are 64 pixels in a block; accordingly, the counter I is checked to determine if it is less than 64. If the number of pixels within a block is other than 64, then that number would be used in place of 64.

If the value in the counter I is equal to 64, the sub-process ends since all pixels within the block have been processed with the RLE zero encoding technique. If the counter value is less than 64, the sub-process continues and determines the value of the current pixel (step 606). The sub-process determines whether or not the pixel value is zero (step 608). If so, a counter K is set to zero (step 610) to count the run-length of zeroes. Thereafter, the pixel value is checked to determine whether or not it is zero (step 612). If it is zero, the values of the counters K and I are both increased by one (step 614). The sub-process continues at the step 612 to check the value of the next pixel, and so on.

If the subsequent pixel is determined to have non-zero value at step 612, 128 is added to the value in counter K to obtain the RLE zero encoded value (step 616). This encoded value is stored in a Jth memory space or location. The value of counter J is increased by one (step 618). Thereafter, the sub-process 514 returns to the step 604 to encode the next pixel value.

Referring back to the step 608, if the pixel value is not zero, the value (P) is divided by two (step 620). The resulting value (P') is stored in a Jth memory space or location as an encoded pixel value (step 622). The counters I and J are increased by one, respectively (step 624). Thereafter, the sub-process 514 returns to the step 604 to encode the next pixel value.

As an illustration of the above process, if the RLE zero encoding is performed on pixel values of 5 3 0 0 0 0 0 0 0 1, the resulting value would be 2 1 135 0. The value 135 denotes seven zeros in sequence, which can be obtained by subtracting 128 from 135. The values 2, 1, and 0 represent the non-zero values 5, 3, and 1, respectively.

Figure 7:
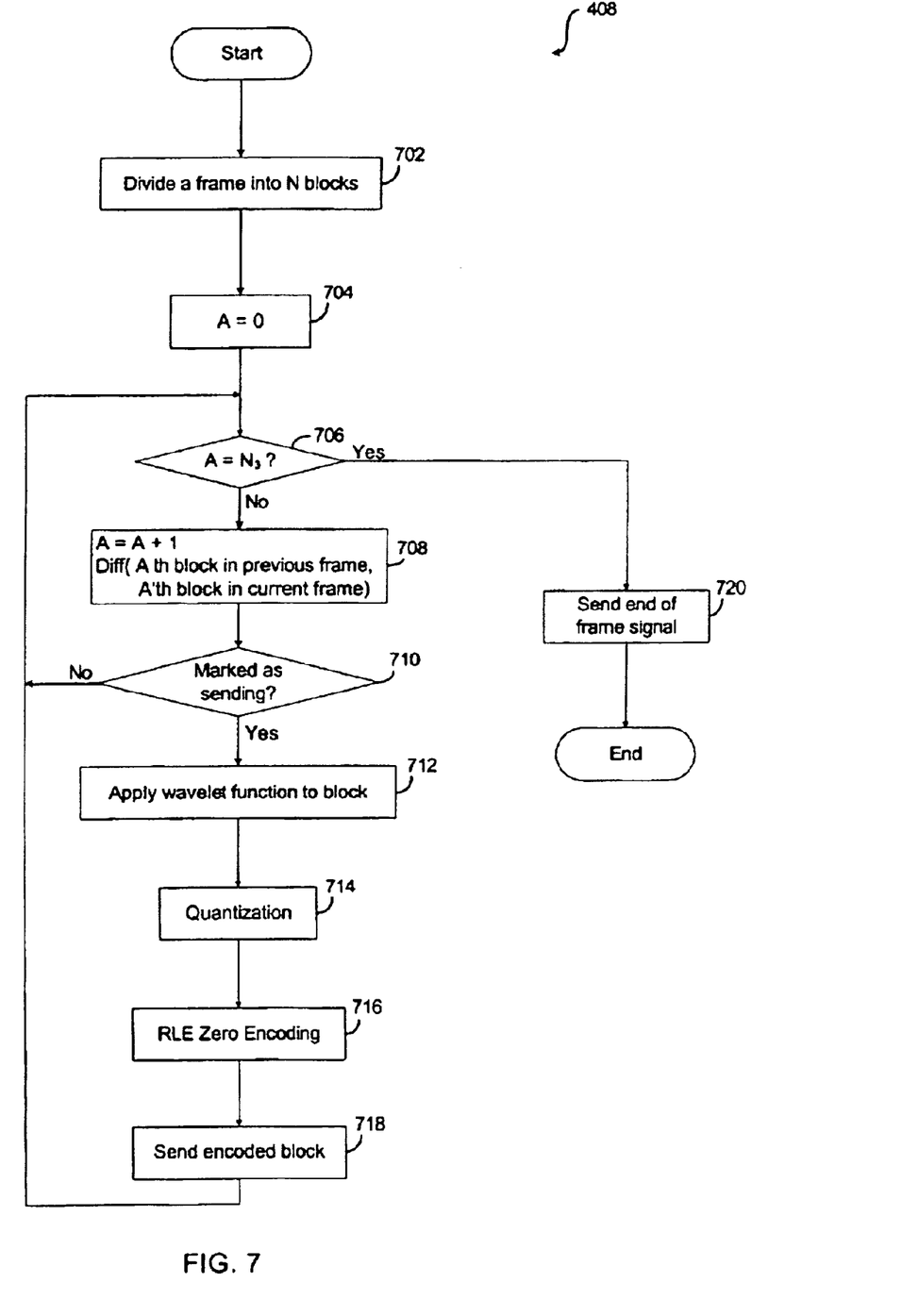
FIG. 7 illustrates a flow chart on a method of encoding prediction frames according to one embodiment of the present invention.

FIG. 7 shows the step or sub-process 408 for encoding the prediction frames according to one embodiment of the present invention. The prediction frame is divided into $N_3$ number of blocks (step 702). In one embodiment, $N_3$ is 304 and each block has dimensions of 8 pixels by 8 pixels (see FIG. 9). A counter A is set to zero (step 704). The counter value is examined to determine whether or not it is equal to $N_3$ (step 706). If so, the end of a frame signal is sent (step 720), and the sub-process 408 is terminated. Generally, the end-of-a-frame signal is embedded into the last block of the frame to indicate to the video receiver system that all the blocks of the current frame have been transmitted.

If the value of the counter A is not equal to $N_3$, one of the blocks is retrieved for encoding. The counter value is increased by one, and a "diff function" is performed by comparing the difference between the values of the current block and the corresponding block in the previous frame, i.e., comparison frame (step 708). Depending on the magnitude of the difference, the current block may or may not be marked for transmission to the video receiver system, as will be described below in more detail in connection with FIG. 8. In one embodiment, the "previous or comparison frame" refers to a frame that was transmitted immediately prior to the current frame, where the previous frame may be either a reference or prediction frame. In other embodiments, the term "previous or comparison frame" refers to a prior reference frame, so that the value of the current block is compared only to a corresponding block in the prior reference frame.

At step 710, the block of the frame, processed by the diff function in step 708, is examined to determine if it has been marked in the previous step. If the block has not been marked, the sub process returns to step 706 without transmitting the block, whereupon the next block is retrieved to be processed.

On the other hand, if the block has been marked, a wavelet function is applied to the block to transform its pixels values to have more zeros (step 712). In one embodiment, 2-D Haar transform is used for this purpose. A stepwise quantization method is used to convert the data obtained from the wavelet function to more a manageable form (step 714), where the resulting data contains many values with zero. A run length encoding (RLE), e.g., zero run coding, is used to compress the data (step 716). The steps 712, 714, and 716 above are similar to the description provided previously in connection with encoding reference frames. After the RLE zero encoding step, the encoded block is transmitted to the video receiver system (step 718), and the process is returned to the step 706. The steps above are repeated until all the blocks in the frame have been transmitted.

Figure 8:
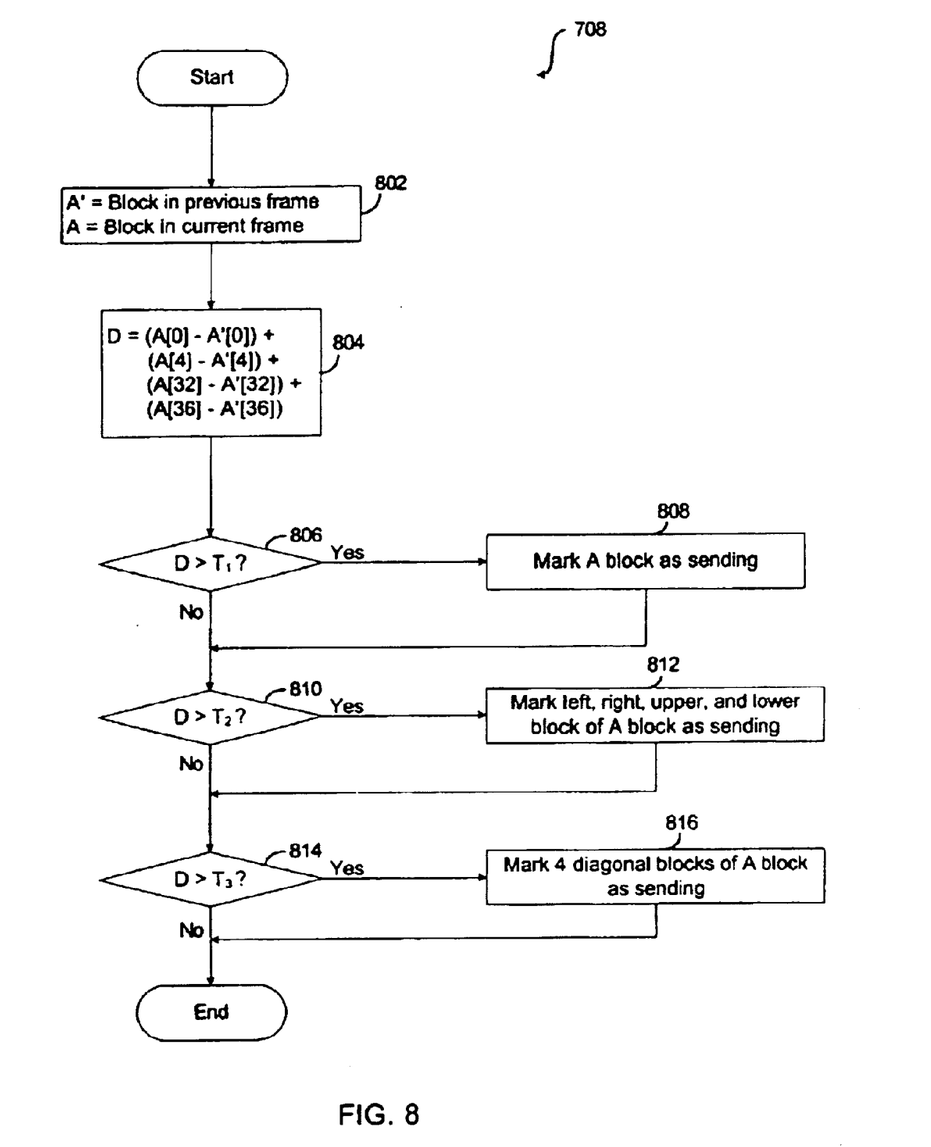
FIG. 8 illustrates a flow chart on a method of performing a diff function on prediction frames according to one embodiment of the present invention.
Figure 10:
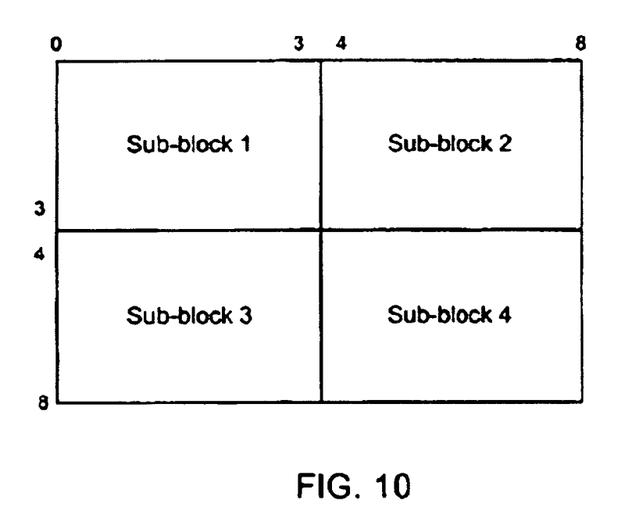
FIG. 10 illustrates a block diagram of a block of frame that is divided into a plurality of sub-blocks according to one embodiment of the present invention.

FIG. 8 shows the step or sub-process 708 according to one embodiment of the present invention. A block (A) of the current frame and its corresponding block (A') in the previous frame are retrieved (step 802). Alternatively, only representative information from the block A' is retrieved. In one embodiment, the blocks are divided into four sub-blocks to perform the diff function (see FIG. 10). Each sub-block has dimensions of 4 pixels by 4 pixels. As used herein, the term "diff function" refers to a method of comparing representative values of one or more portions of a frame with representative values of one or more portions of another frame.

A difference value D is obtained by summing the difference in pixel values between the corresponding sub-blocks of blocks A and A' (step 804). In one embodiment, the values of four representative pixels, one from each sub-block, are determined for the current block A. The sample pixels selected are the first pixel in each of the sub-blocks, i.e., A[0], A[4], A[32], and A[36]. Alternatively, other pixels may be selected as samples. The values of corresponding pixels in the previous block A' are determined, i.e., A'[0], A'[4], A'[32], and A'[36]. The pixel values from the block A are subtracted by corresponding pixel values from the block A'. These resulting values are summed to obtain the difference value D.

Once the difference value D has been obtained, it is compared with three predetermined threshold values T1, T2, and T3, in sequence to determine which blocks in the current frame need to be transmitted. These predetermined values have the following relationship to each other: T1<T2<T3.

Initially, D is compared with T1 (step 806). If D is greater than T1, the current block, i.e., a block 904 (FIG. 9), is marked to be transmitted (step 808). The block is marked because the difference between it and the corresponding block of the previous frame is considered great enough that an acceptable frame could not be generated using the corresponding previous block. If D is not greater than T1, then the block is not marked since the previous corresponding block may be used in place of the current block 604 to generate a frame of acceptable quality at the video receiver system.

At next step, D is compared with T2 (step 810). If D is greater than T2, blocks 906 (FIG. 9) that are adjacent to the block 904 are marked to be transmitted (step 812). As used herein, the term "adjacent blocks" refer to the blocks that abut the current block 904 at left, right, top and bottom sides. These adjacent blocks 906 are marked because the difference between the corresponding previous block and the current block is considered great enough that additional blocks are needed to generate a frame of acceptable quality at the video receiver system. If, on the other hand, D is not greater than T2, then the adjacent blocks are not marked.

Figure 9:
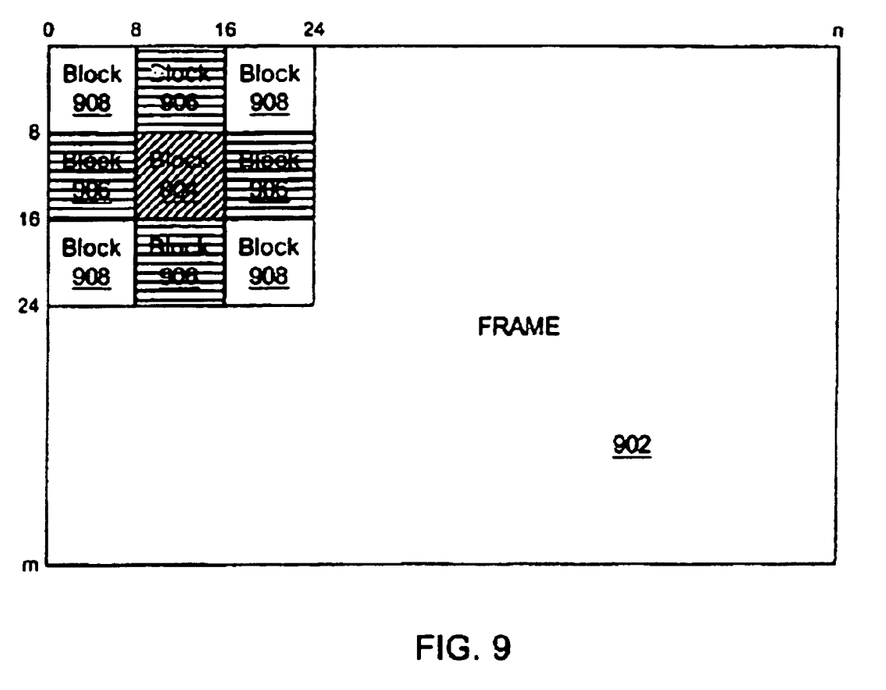
FIG. 9 illustrates a block diagram of a frame included into a plurality of blocks according to one embodiment of the present invention.

Subsequently, D is compared with T3 (step 814). If D is greater than T3, diagonal blocks 908, i.e., the blocks that are diagonal to block 904, are marked to be transmitted (step 816). Diagonal blocks 908 are marked because the difference between the corresponding previous block and the current block is considered great enough that both the adjacent and diagonal block are needed to reproduce the frame of acceptable quality at the video receiver system. If, on the other hand, D is not greater than T3, then the diagonal blocks are not marked, and the sub-process terminates.

In one embodiment, decoding the encoded data at the video receiver system involves merely reversing the encoding steps described above. An inverse RLE zero encoding is performed on the encoded data. A dequantization step is performed on the resulting data. Finally, an inverse 2 D Haar transform is performed to decode the data.

It will be apparent to those skilled in the art that various modifications and variations can be made in the video data streaming apparatus and methods of the present invention without departing from the spirit or scope of the invention.

Thus, it is intended that the present invention covers the modifications and variations of this invention provided they come within the scope of the appended claims and their equivalents.

What is claimed is:

1. A method of streaming video data, comprising:

providing a plurality of frames to be transmitted from a video transmitter system to a video receiver system;

categorizing the plurality of frames into at least one reference frame and at least first and second prediction frames, the reference frame and the first prediction frame are encoded for transmission to the video receiver system, the reference frame being encoded using a zero run coding method;

transmitting the encoded reference frame to the video receiver system;

dividing the second prediction frame into a plurality of blocks;

determining whether any of the plurality of blocks needs to be transmitted to reproduce the second prediction frame of acceptable quality at the video receiver system, wherein the determining step includes comparing a block of the second prediction frame with a corresponding block of a comparison frame that has been previously encoded for transmission to the video receiver system, the comparing step including obtaining a difference value D between a first value representing the block of the second prediction frame and a second value representing the corresponding block of the comparison frame; and transmitting to the video receiver system the blocks that have been determined necessary to reproduce the first prediction frame of acceptable quality at the video receiver system;

dividing the block of the second prediction frame into a first set of sub-blocks;

obtaining a first set of representative values of the first set of sub-blocks;

dividing the corresponding block of the comparison frame into a second set of sub-blocks; and obtaining a second set of representative values for the second set of sub-blocks, wherein the difference value D is obtained by subtracting one of the set of the representative values from the other set of the representative values.

2. The method of claim 1, further comprising:

marking the blocks of frame that have been determined as necessary to reproduce the prediction frame of acceptable quality at the video receiver system.

3. The method of claim 1, wherein the comparison frame is the reference frame.

4. The method of claim 1, wherein the comparison frame is the first prediction frame.

5. The method of claim 1, wherein the comparison frame is a frame that has been encoded for transmission immediately prior to the second prediction frame.

6. The method of claim 1, further comprising:

comparing the difference value D to a first threshold value T1; and determining whether to transmit the block of the second prediction frame to the video receiver system according to a result of the comparing of the difference value D to the first threshold value T1.

7. The method of claim 6, wherein the block of the second prediction frame is marked for transmission to the video receiver system if the difference value D is greater than the first threshold value T1.

8. The method of claim 1, wherein the plurality of frame to be transmitted are categorized into only two types of frames.

9. A method of streaming video data; comprising:

providing a plurality of frames to be transmitted from a video transmitted system to a video receiver system;

categorizing the plurality of frames into at least one reference frame and at least first and second prediction frames, encoding the reference for transmission to the video receiver system using a zero run coding method;

transmitting the encoded reference frame to the video receiver system;

dividing the second prediction frame into a plurality of blocks;

determining whether any of the plurality of blocks needs to be transmitted to reproduce the second prediction frame of acceptable quality at the video receiver system; and transmitting to the video receiver system the blocks that have been determined necessary to reproduce the second prediction frame of acceptable quality at the video receiver system, wherein the determining step includes:

comparing a block of the second prediction frame with a corresponding block of a comparison frame that has been previously encoded for transmission to the video receiver system in order to obtain a difference value D between a first value representing the block of the second prediction frame and a second value representing the corresponding block of the comparison frame, comparing the difference value D to a first threshold value T1;

determining whether to transmit the block of the second prediction frame to the video receiver system according to a result of the comparing of the difference value D to the first threshold value T1;

comparing the difference value D to a second threshold value T2; and determining whether to transmit a first set of blocks in close proximity to the block of the second prediction frame according to a result of the comparing the difference value D to the second threshold value.

10. The method of claim 9, further comprising:

comparing the difference value D to a third threshold value T3; and determining whether to transmit a second set of blocks in close proximity to the block of the second prediction frame according to a result of the comparing the difference value D to the third threshold value, wherein the comparison frame is the reference frame or the first prediction frame.

11. The method of claim 10, wherein the first set of blocks are adjacent blocks to the block of the second prediction frame.

12. The method of claim 10, wherein the second set of blocks are diagonal blocks to the block of the second prediction frame.

13. The method of claim 10, wherein the first, second and third threshold values T1, T2, and T3 have the following relationship: T1<T2<T3.

14. A method of streaming video data, comprising:

providing a plurality of frames to be transmitted from a video transmitted system to a video receiver system;

categorizing the plurality of frames into a plurality of reference frames and a plurality of prediction frames;

encoding the plurality of the reference frames using a first encoding method; and encoding the plurality of the prediction frames using a second encoding method different from the first encoding method, the second encoding method including:

dividing a first prediction frame into a plurality of blocks;

determining whether any of the plurality of blocks of the first prediction frame needs to be transmitted to reproduce the first prediction frame of acceptable quality at the video receiver system; and transmitting to the video receiver system the blocks of the first prediction frame that have been determined necessary to reproduce the first prediction frame of acceptable quality at the video receiver system, wherein the determining step includes:

comparing a block of the first prediction frame with a corresponding block of a comparison frame to obtain a difference value D;

comparing the difference value D with a first threshold value T1;

indicating the block of the first prediction frame as needing to be transmitted to the video receiver system if the difference value D is greater than the first threshold value T1;

comparing the difference value D to a second threshold value T2; and indicating a first set of blocks in close proximity to the lock of the first prediction frame as needing to be transmitted to the video receiver system if the difference value D is greater than the second threshold value T2.

15. The method of claim 14, further comprising:

comparing the difference value D to a third threshold value T3; and indicating a second set of blocks in close proximity to the block of the first prediction frame as needing to be transmitted to the video receiver system if the difference value D is greater than the third threshold value T2.

16. The method of claim 14, wherein the comparison frame is a frame that immediately precedes the first prediction frame in the order of transmission to the video receiver system.

17. The method of claim 16, wherein the comparison frame is a second prediction frame.

18. The method of claim 14, wherein the comparison frame is a reference frame.

19. A method of streaming video data, comprising:

providing a plurality of frames to be transmitted from a video transmitter system to a video receiver system;

categorizing the plurality of frames into at least one reference frame and at least first and second prediction frames;

encoding the reference frame to be transmitted to the video receiver system using a zero run coding method;

transmitting the encoded reference frame to the video receiver system;

dividing the second prediction frame into a plurality of blocks;

determining whether any of the plurality of blocks needs to be transmitted to reproduce the second prediction frame of acceptable quality at the video receiver system;

transmitting to the video receiver system the blocks that have been determined necessary to reproduce the second prediction frame of acceptable quality at th video receiver system;

wherein the determining step includes:

comparing a block of the second prediction frame with corresponding block of a comparison frame that has been previously encoded for transmission to the video receiver system in order to obtain a difference value D between a first value representing the block of the second prediction frame and a second value representing the corresponding block of the comparison frame;

comparing the difference value D to a second threshold value T2; and determining whether to transmit a first set of blocks in close proximity to the block of the second prediction frame according to a result of the comparing the difference value D to the second threshold value.

20. The method of claim 19, wherein the determining step further comprises:

comparing the difference value D to a first threshold value T1; and determining whether to transmit the block of the second prediction frame to the video receiver system according to a result of the comparing of the difference value D to the first threshold value T1.

* * * * *